United States Patent
Wang et al.

(10) Patent No.: US 7,944,903 B2
(45) Date of Patent: May 17, 2011

(54) MULTI-CELL JOINT-DETECTION METHOD IN TIME-SLOTTED CDMA SYSTEM

(75) Inventors: Yingmin Wang, Qingpu District (CN); Nan Zhong, Qingpu District (CN)

(73) Assignee: Shanghai Ultimate Power Communications Technology Co., Ltd., Shanghai, P.R. (CN)

( * ) Notice: Subject to any disclaimer, the term of this patent is extended or adjusted under 35 U.S.C. 154(b) by 617 days.

(21) Appl. No.: 11/916,196

(22) PCT Filed: May 17, 2006

(86) PCT No.: PCT/CN2006/001004
§ 371 (c)(1),
(2), (4) Date: Apr. 25, 2008

(87) PCT Pub. No.: WO2006/128354
PCT Pub. Date: Dec. 7, 2006

(65) Prior Publication Data
US 2008/0273511 A1   Nov. 6, 2008

(30) Foreign Application Priority Data
Jun. 3, 2005  (CN) ............... 2005 1 0075207

(51) Int. Cl.
*H04B 7/216* (2006.01)
(52) U.S. Cl. .................. 370/342; 370/335; 370/441
(58) Field of Classification Search .............. 370/329, 370/335, 342, 441
See application file for complete search history.

(56) References Cited

U.S. PATENT DOCUMENTS

| 6,944,142 B2 * | 9/2005 | Grieco | 370/331 |
| 2003/0031238 A1 * | 2/2003 | Li et al. | 375/147 |
| 2006/0215611 A1 * | 9/2006 | Nakagawa et al. | 370/332 |

FOREIGN PATENT DOCUMENTS

| CN | 1196843 | 10/1998 |
| CN | 1423863 | 6/2003 |
| CN | 1753322 | 3/2006 |
| WO | WO 2004/028005 A1 | 4/2004 |
| WO | WO 2005/020458 A1 | 3/2005 |

* cited by examiner

*Primary Examiner* — Phuc Tran
(74) *Attorney, Agent, or Firm* — Merchant & Gould P.C.

(57) ABSTRACT

A multi-cell joint-detection method in a time-slotted CDMA system includes: performing a multiple code set channel estimation on received signal data and obtaining channel estimation results of a home cell and of neighboring cells; adjusting the channel estimation results of the home cell and/or neighboring cells or the estimation result of a combined channel response according to a comparative delay difference between signals of users in different cells; and performing a joint-detection according to the estimation result of the combined channel response obtained by adjusting the channel estimation results of the users in different cells or according to the estimation result of the combined channel response. The MAI between neighboring universal-frequency cells having comparative delays and especially large comparative delays is greatly suppressed and the performance of the time-slotted CDMA system when working in neighboring universal-frequency cells is improved.

8 Claims, 2 Drawing Sheets

--Prior Art--

--Prior Art--

MULTI-CELL JOINT-DETECTION METHOD IN TIME-SLOTTED CDMA SYSTEM

FIELD OF THE INVENTION

The present invention relates to a joint-detection technology in a field of mobile communication and especially to a multi-cell joint-detection method in a time-slotted CDMA system.

BACKGROUND

In a CDMA (Code Division Multiple Access) mobile communication system, since signals of different users are correlated to some extent, MAI (Multiple Address Interference) has become a main interference in a broadband CDMA system. A traditional signal separation method in the CDMA system is to regard the MAI as the noise and the separation of signals of different users as independent, i.e. the single user detection technology. According to this detection method, a SNR will be seriously deteriorated and the system capacity will be limited. In fact, a lot of information for improving accuracy of signal separation is included in the MAI, such as a known user channel code, channel estimation of each user, which is used in a multi-user detection technology to perform the joint-detection. According to different multiple access interference processing methods, the multi-user detection technology can be interference counteracting or joint-detection. A basic idea of the interference counteracting is decision feedback, which firstly decides part data from all the received signals and then reconstructs signals corresponding to the data according to the data and user spreading code and then subtracts the reconstructed signals from all the received signals and thus in a cycle and iteration way. The joint-detection technology refers to a signal separation technology for separating all users' signals in one step by fully making use of the MAI.

In the CDMA system, the joint-detection technology may be adopted to eliminate the MAI and intersymbol interference of signals received in the home cell. TD-SCDMA (Time Division Synchronous Code Division Multiple Access) system is a time-slotted CDMA system which performs the joint-detection technology on multi-user's signals in the home cell.

In the TD-SCDMA system, a burst signal structure in a normal slot is shown in FIG. 1, wherein a midamble (also called channel estimation code) in the middle of the burst signal is used to perform the channel estimation and data blocks at the two sides are used to transmit service data.

The single cell joint-detection method uses the structure information (including spreading code and channel response) of signals transmitted by all the users in the home cell and regards interference signals from other cells as Gauss white noise. Therefore, the single cell joint-detection method is capable in suppressing the intersymbol interference and the MAI in the home cell and can greatly improve the system performance for a single cell or differ-frequency CDMA system.

However, in a case of universal-frequency networking, there is a strong interference between neighboring cells with the same frequency (hereinafter referred to as neighboring universal-frequency cells) and this kind of interference influence very much on the system performance. Especially when multiple code channels are working at a boundary between the neighboring universal-frequency cells, the universal-frequency interference is the most important interference. And at this time, the single cell joint-detection method is incapable of suppressing the neighboring universal-frequency cell interference.

If the structure information of neighboring universal-frequency cells is used to expand the joint-detection method from a single cell to the universal-frequency multiple cells, the performance of the time-slotted CDMA system in universal-frequency networking will be greatly improved. The Chinese patent application 200410080196.6 proposes "a method for performing multi-user joint-detection in a neighboring cell in a TDD-CDMA system" in which channel estimation results of neighboring cells are obtained according to a multiple code set channel estimation method and code channels of neighboring cells are grouped and then the joint-detection is performed according to the channel estimation result of neighboring cells and the result of code channel grouping. If this joint-detection method is applied in the time-slotted CDMA system with multiple universal-frequency cells, the MAI between neighboring universal-frequency cells is greatly suppressed and the performance of the time-slotted CDMA system when working in neighboring universal-frequency cells is improved. This technical solution is applicable to cases when user signals in different cells are synchronous or near synchronous or with little comparative delay.

Generally, there is a comparative delay between signals of universal-frequency cells. If only the interference from the cell nearest cell is taken into account, the comparative delay is small so if the channel response window of each user in different cells is obtained in its own cell, the main path can be guaranteed to be in the window and the influence of the comparative delay can be neglected. However, in a large-scale networking, the universal-frequency interference from peripheral cells should be taken into account and in a layered networking, the universal-frequency interference between macro cells and micro cells should be taken into account. For example, in a schematic diagram showing relations between main paths in the channel estimation results of users in neighboring cells and home cell shown in FIG. 2, neighboring cell 1 has a comparatively small delay $\Box T1$ with the home cell and if the channel estimation result of each user in the cell is intercepted according to the present method it can be guaranteed that the main path is within the result; while neighboring cell 2 has a comparatively large delay $\Box T2$ with the home cell and if the channel estimation result of each user in the cell is still intercepted according to the present method the main path of the user may be intercepted by other users in the cell so that the universal-frequency interference cannot be properly eliminated and the system performance deteriorates.

SUMMARY OF THE INVENTION

An objective of the present invention is to provide a multi-cell joint-detection method in a time-slotted CDMA system so as to overcome a defect of the prior art that cannot be adapted to a case when signals of multiple cells have comparatively large delays and to accurately eliminate an interference from universal-frequency cells and to improve a performance of the time-slotted CDMA system when it works in universal-frequency cells with comparatively large delays.

The present invention provides a multi-cell joint-detection method in a time-slotted CDMA system, including steps of:

A. performing a multiple code set channel estimation on received signal data and obtaining channel estimation results of a home cell and of neighboring cells;

B. adjusting the channel estimation results of the home cell and/or neighboring cells or the estimation result of a combined channel response according to a comparative delay difference between signals of users in different cells;

C. performing a joint-detection according to the estimation result of the combined channel response obtained by adjusting the channel estimation results of the users in different cells or according to the estimation result of the combined channel response and obtaining detecting data.

Step B includes:

B1. setting a total length Ln of the channel estimation results of different cells;

B2. obtaining a comparative delay difference $\Delta T_n$ between signals of the users in a neighboring cell and in the home cell and rounding the comparative delay difference $\Delta T_n$ and obtaining a standard delay difference $\Delta T_n'$;

B3. intercepting the channel estimation result of each user in the cell from the whole channel estimation result of the home cell and from the whole channel estimation result of the neighboring cell respectively;

B4. modifying the channel estimation results of the home cell and/or neighboring cells or the estimation result of the combined channel response according to the intercepting manner of the user channel estimation result and the comparative delay difference $\Delta T_n$.

Alternatively, the round operation of the comparative delay difference $\Delta T_n$ in step B2 specifically includes:

floor, ceiling or self-defining rounding of the comparative delay difference $\Delta T_n$. Step B3 specifically includes:

B311. intercepting the channel estimation result of each user in the home cell respectively from the first chip of the whole channel estimation result of the home cell;

B312. if signals in a neighboring cell lag behind that in the home cell, cyclically intercepting the channel estimation result of each user in the neighboring cell respectively from the $\Delta T_n+1$ chip of the whole channel estimation result of the neighboring cell;

B313. if signals in a neighboring cell are earlier than that in the home cell, cyclically intercepting the channel estimation result of each user in the neighboring cell respectively from the $Ln-\Delta T_n'+1$ chip of the whole channel estimation result of the neighboring cell;

Alternatively, step B4 specifically includes:

B411. setting the length of the channel estimation result of the home cell or the estimation result of the combined channel response to $W_0$ and setting the length of the channel estimation result of the neighboring cell or the estimation result of the combined channel response to $W_n$; expanding $\Delta T_{max}^{-'}$ chips set to 0 at the beginning of the channel estimation result of each user in the home cell or the estimation result of the combined channel response and expanding $(W_{max}-W_0)$ chips set to 0 at the end of the estimation result, wherein $\Delta T_{max}^{-'}$ is a comparative delay of a signal of a user in the home cell and in neighboring cells with a maximum value which is earlier than all the comparative delay $\Delta T_n'$ of the signals of users in the home cell;

$W_{max}$ is a maximum value between the length of the channel estimation result of the home cell or the estimation result of the combined channel response, a result by subtracting the length of the comparative delay from the length of the channel estimation result of the neighboring cell or the estimation result of the combined channel response which is earlier than that of the home cell, a result by adding the length of the comparative delay from the length of the channel estimation result of the neighboring cell or the estimation result of the combined channel response which is slower than that of the home cell;

B412. expanding the channel estimation result of neighboring cells or the estimation result of the combined channel response according to the following manner:

for the channel estimation result of neighboring cells or the estimation result of the combined channel response which are slower than that of the home cell, expanding $(\Delta T_{max}^{-'}+\Delta T_n')$ chips set to 0 at the beginning of the estimation result of each user in neighboring cells and expanding $(W_{max}-(W_n+\Delta T_n'))$ chips set to 0 after the estimation result;

for the channel estimation result of neighboring cells or the estimation result of the combined channel response which are earlier than that of the home cell, expanding $(\Delta T_{max}^{-'}-\Delta T_n')$ chips set to 0 at the beginning of the estimation result of each user in neighboring cells and expanding $(W_{max}-(W_n-\Delta T_n'))$ chips set to 0 after the estimation result.

Alternatively, step B4 specifically includes:

B421. setting the length of the channel estimation result of the home cell or the estimation result of the combined channel response to 0 and setting the length of the channel estimation result of the neighboring cell or the estimation result of the combined channel response to $W_n$; expanding l1 chips set to 0 at the beginning of the channel estimation result of each user in the home cell or the estimation result of the combined channel response and expanding l2 chips set to 0 after the estimation result;

B422. expanding the channel estimation result of neighboring cells or the estimation result of the combined channel response according to the following manner:

if neighboring cells are slower than the home cell, expanding $l1+\Delta T_n'$ chips set to 0 at the beginning of the estimation result, expanding chips set to 0 or deleting chips at the end of the estimation result according to the relation between $W_n+\Delta T_n'$ and $W_0+l2$ to make the adjusted length equal to that of the estimation result of the user in the home cell; if $\Delta T_n'>l2+W_0$, a full zero chip with a length of W1+l1+l2 constituting the estimation result of the user;

if neighboring cells are earlier than the home cell, expanding $l1-\Delta T_n'$ chips set to 0 at the beginning of the estimation result according to the relation between $\Delta T_n'$ and l1 or deleting the first $\Delta T_n'-l1$ chips of the channel estimation result of the user, expanding chips set to 0 or deleting chips at the end of the estimation result according to the relation between $W_n-\Delta T_n'$ and $W_0+l2$ to make the adjusted length equal to that of the estimation result of the user in the home cell; if $\Delta T_n'>l1+W_n$, a full zero chip with a length of W1+l1+l2 constituting the estimation result of the user.

Preferably, the estimation result of the combined channel response of each user in the home cell and in neighboring cells according to a following formula:

$b=C \otimes h$, wherein C represents a spreading code corresponding to a code channel of the user, $\otimes$ is a convolution operator and h is a channel estimation result of the user.

Alternatively, step B further includes dividing code channels in each neighboring cell into different groups.

Alternatively, the code channels in each neighboring cell are divided into different groups according to the following methods:

dividing code channels in each neighboring cell into different groups according to the cell they belong to; and/or dividing code channels in each neighboring cell into different groups according to the power or amplitude of code channels; and/or dividing code channels in each neighboring cell into different groups according to code channel correlation.

The technical solution of the present invention shows that according to the method of the present invention, a detection error caused by the main path of a user in a cell with a comparative large delay going beyond the window can be avoided and the MAI from universal-frequency neighboring cells with a large comparative delay is suppressed and the system performance of the time-slotted CDMA system in universal-frequency networking is improved by adjusting the channel estimation result of each user in different cells or the estimation result of the combined channel response according to the comparative delay information between cells and performing the multi-cell joint-detection with the adjusted estimation result for a case that there are comparative delays between signals in universal-frequency cells in the CDMA system.

DETAILED DESCRIPTION OF THE INVENTION

For a case that there are comparative delays between signals in neighboring cells with the same frequency (hereinafter referred to as neighboring universal-frequency cells), a main idea of the present invention is to firstly obtain channel estimation results of neighboring cells or an estimation result of a combined channel response according to a multiple code set channel estimation method, and then to modify the channel estimation result of each cell or the estimation result of the combined channel response according to the comparative delays between signals of users in different cells so as to avoid introducing signals of other users in the cell in the channel estimation result of each user or the estimation result of the combined channel response, and then perform the multi-cell joint-detection according to the estimation result of the combined channel response so as to obtain the detection data.

In order to make the solution of the present invention better understood by those skilled in the art, a detail description on the present invention will be given with reference to drawings and embodiments.

Figure 3:
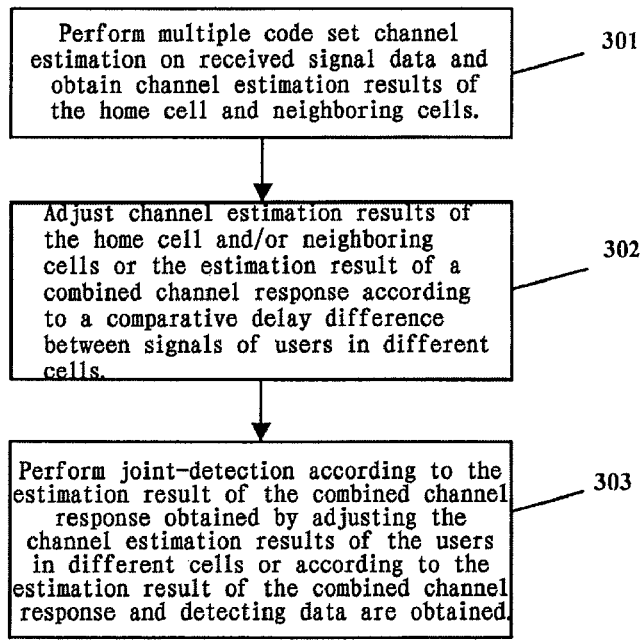
FIG. 3 is a flow chart showing a realization of a method according to the present invention.

The realization process of the present invention is shown in FIG. 3 and includes the following steps:

Step 301: Multi-cell Channel Estimation. A multiple code set channel estimation is performed on received signal data and channel estimation results of the home cell and neighboring cells are obtained.

Channel estimation code parts of multiple universal-frequency cells correspond to channel estimation code signals of multiple code sets and channel estimation results of multiple universal-frequency neighboring cells can be obtained according to the multi-code set channel estimation method.

For a case when there are response signals to multi-code set channel estimation codes in universal-frequency cells, the channel estimation results can be obtained according to a method of multi-code set joint iterative channel estimation adopting a decision feedback based on a limited time position.

The result of a single code set channel estimation is processed with the limited time decision and only limited number of taps with comparatively strong signal responses are remained so as to recover other code set interference signals and to counteract these interference signals to get net signals of each code set, and then the single code set channel estimation is performed on net signals of each code set, and the above processing is repeated for the iteration times and finnaly the channel estimation result is outputted.

An optimized multi-code set channel estimation method can be adopted to extract the largest interference tap from the single code set channel estimation result to directly perform the interference recovery and interference counteraction computation so as to obtain the channel estimation results of multiple cells.

In step 302, the channel estimation results of the home cell and/or neighboring cells or the estimation result of a combined channel response are adjusted according to a comparative delay difference between signals of users in different cells so as to make the relation between the channel estimation result of the user in a neighboring cell and the channel estimation result of the user in the home cell or the relation between the estimation result of the combined channel response of the user in a neighboring cell and the estimation result of the combined channel response of the user in the home cell is accurate in time and to avoid introducing signals of other users in the cell in the channel estimation result of each user or the estimation result of the combined channel response so as to guarantee that interferences from neighboring cells can be eliminated when performing the joint-detection.

The adjusting method will be described in detail later.

In step 303, the joint-detection is performed according to the estimation result of the combined channel response obtained by adjusting the channel estimation results of the users in different cells or according to the estimation result of the combined channel response and detecting data are obtained.

In order to reduce the complexity in the joint-detection, before the joint-detection is performed on the adjusted estimation results of different cells, code channels of different neighboring cells can be firstly divided into different groups and then the joint-detection may be performed on the estimation results of adjusted and grouped code channels of the present and neighboring cells.

The code channels in each neighboring cell can be divided into different groups according to the following ways:

(1) Code channels in each neighboring cell can be divided into different groups according to the cell they belong to: the number of the groups equals to that of the universal-frequency cells and code channels in each group only include those of the cell.

(2) Code channels in each neighboring cell are divided into different groups according to the power or amplitude of code channels: the power or amplitude of each code channel signal can be estimated according to the channel response obtained from the multi-cell channel estimation results or according to the output result of the matching filtering of each code channel; and then code channels are divided into different groups according to the power or amplitude.

(3) Code channels in each neighboring cell are divided into different groups according to code channel correlation: firstly the correlation between each code channels in the multi-cell signals is estimated and then all the code channels are divided into different groups according to the correlation; the correlation of code channels can be the average, maximum or minimum value of the correlation.

(4) Hybrid method based on the above ways or other grouping methods.

The joint-detection method can be an interference counteraction method, a linear block balance method or a combination of the two methods. For example, the linear block balance method may be adopted in each group and the interference counteraction method may be adopted between different code channel groups.

The code channels in the code channel grouping and joint-detection can be those pre-allocated by each neighboring cell;

A lot of code channels are allocated in multiple cells for universal-frequency neighboring cells. Therefore, those code channels can be the activated ones remained after the activation detecting processing is performed on all the code channels of each neighboring cell.

According to the present invention, for asynchronous interferences between signals in universal-frequency neighboring cells in the time-slotted CDMA system, the channel estimation result of the home cell and/or neighboring cells or the estimation result of the combined channel response is modified according to the comparative delays between signals of users in different cells so as to suppress the asynchronous universal-frequency interference from neighboring cells.

Firstly, the channel estimation result of each user in the cell from the whole channel estimation result of the home cell neighboring cells is intercepted; and then the channel estimation results of the home cell and/or neighboring cells or the estimation result of the combined channel response are modified according to the comparative delay difference.

Many methods can be adopted to modify the channel estimation results of the home cell and/or neighboring cells and an example will be given.

When intercepting the user channel estimation result, if the number of users allowed in each cell to perform the channel estimation is the same, the length of the intercepted user channel estimation result for all users in each cell is the same; for users in different cells, the intercepted user channel estimation result is the same.

For the simplicity of description, supposing that the comparative delay between a neighboring cell and the home cell is $\Delta T_n$ and the maximum delay between a neighboring cell which is slower than the home cell and the home cell is $\Delta T_{max}^+$ and the cell with $\Delta T_{max}^+$ is numbered as n1; the maximum delay between a neighboring cell which is earlier than the home cell and the home cell is $\Delta T_{max}^-$ and the cell with $\Delta T_{max}^-$ is numbered as n2. Supposing one cell in the system can perform the channel estimation on K users and the length of the whole channel estimation results in the cell is Ln, wherein Ln/K=W and the result of floor rounding W is W', then the length of each user channel estimation result is W'. $\Delta T_n$, $\Delta T_{max}^+$, $\Delta T_{max}^-$, W' and Ln are all taken the minimum time, such as the chip, as the computation unit.

The floor rounding or ceiling rounding or self-defined rounding can be performed on the comparative delay difference $\Delta T_n$ and the standard delay difference $\Delta T_n'$ can be obtained and then $\Delta T_{max}^+$ and $\Delta T_{max}^-$ are rounded and $\Delta T_{max}^{+\prime}$ and $\Delta T_{max}^{-\prime}$ are obtained.

The First Method:

A user of the home cell sequentially intercepts W' chips in the whole channel estimation result of the cell from the first chip and obtains the channel estimation results of the $1^{st}$ ... $K^{th}$ users; and then the channel estimation results are expanded according to $\Delta T_n$ and 0 is added in the expanded part, wherein the specific expanding method is: 0 is added at the beginning of the channel estimation result of each user signal in the home cell and the number of 0 added is $\Delta T_{max}^{-\prime}$, wherein if no neighboring cell is earlier than the home cell, no 0 is added at the beginning; 0 is added at the end of the channel estimation result of each user signal in the home cell and the number of 0 added is $\Delta T_{max}^{+\prime}$, wherein if no neighboring cell is slower than the home cell, no 0 is added at the end;

For a user in a neighboring cell, if signals in the neighboring cell are slower than those of the home cell, W' chips are sequentially and cyclically intercepted from the channel estimation result of the neighboring cell from the $(\Delta T_n+1)^{th}$ chip, and if the neighboring cell is earlier than the home cell, W' chips are sequentially and cyclically intercepted from the channel estimation result of the neighboring cell from the $(Ln-\Delta T_n'+1)^{th}$ chip, so that the channel estimation results of the $1^{st}$ ... $K^{th}$ users are obtained; and then the channel estimation results are expanded and 0 is added in the expanded part, wherein the specific expanding method is:

If $\Delta T_n=0$, the expanding method is the same with that of the home cell;

If signals in the neighboring cell are slower than those of the home cell and n≠n1, $(\Delta T_{max}^{-\prime}+\Delta T_n')$ 0s are added at the beginning of the channel estimation result of the user and $(\Delta T_{max}^{+\prime}-\Delta T_n')$ 0s are added at the end;

If signals in the neighboring cell are slower than those of the home cell and n=n1, $(\Delta T_{max}^{+\prime}+\Delta T_{max}^{-\prime})$ 0s are added at the beginning of the channel estimation result of the user and no 0 is added at the end;

If signals in the neighboring cell are earlier than those of the home cell and n≠n2, $(\Delta T_{max}^{-\prime}-\Delta T_n')$ 0s are added at the beginning of the channel estimation result of the user and $(\Delta T_{max}^{+\prime}+\Delta T_n')$ 0s are added at the end;

If signals in the neighboring cell are earlier than those of the home cell and n=n2, $(\Delta T_{max}^{+\prime}+\Delta T_{max}^{-\prime})$ 0s are added at the end of the channel estimation result of the user and no 0 is added at the beginning;

The Second Method:

A user of the home cell sequentially intercepts W' chips in the whole channel estimation result of the cell from the first chip and obtains the channel estimation results of the $1^{st}$ ... $K^{th}$ users; and then the channel estimation results are expanded according to $\Delta T_n$ and 0 is added in the expanded part, wherein the specific expanding method is: 0 is added at the beginning of the channel estimation result of each user signal in the home cell and the fixed length of 0 added is L1, wherein if no neighboring cell is earlier than the home cell, no 0 is added at the beginning; 0 is added at the end of the channel estimation result of each user signal in the home cell and the fixed length of 0 added is L2, wherein if no neighboring cell is slower than the home cell, no 0 is added at the end;

For a user in a neighboring cell, if signals in the neighboring cell are slower than those of the home cell W' chips are sequentially and cyclically intercepted from the channel estimation result of the neighboring cell from the $(\Delta T_n'+1)^{th}$ chip, and if the neighboring cell is earlier than the home cell, W' chips are sequentially and cyclically intercepted from the channel estimation result of the neighboring cell from the $(Ln-\Delta T_n'+1)^{th}$ chip, so that the channel estimation results of the $1^{st}$ ... $K^{th}$ users are obtained;

And then the channel estimation results are expanded as follows:

for channel estimation result of each user in neighboring cells which are slower than the home cell:
        when $\Delta T_n' \leq L2$, $L1+\Delta T_n'$ chips set to 0 are expanded before the channel estimation result of each user in neighboring cells and $L2-\Delta T_n'$ chips set to 0 are expanded at the end;

when $L2<\Delta T_n'\leqq L2+W'$, $L1+\Delta T_n'$ chips set to 0 are expanded before the channel estimation result of each user in neighboring cells and the last $\Delta T_n'-L2$ chips of the channel estimation result are deleted;

when $\Delta T_n'>L2+W'$, the channel estimation result of each user in neighboring cells are composed by $L1+W'+L2$ chips set to 0;

for channel estimation result of each user in neighboring cells which are earlier than the home cell:

when $\Delta T_n'\leqq L1$, $L1-\Delta T_n'$, chips set to 0 are expanded before the channel estimation result of each user in neighboring cells and $L2+\Delta T_n'$ chips set to 0 are expanded at the end;

when $L1<\Delta T_n'\leqq L1+W'$, $L2+\Delta T_n'$ chips set to 0 are expanded at the end of the channel estimation result of each user in neighboring cells and the first $\Delta T_n'-L1$ chips of the channel estimation result are deleted;

when $\Delta T_n'>L1+W'$, the channel estimation result of each user in neighboring cells are composed by $L1+W'+L2$ chips set to 0.

For the simplicity of expanding, $L1=L2=L$; and the number of L can be co-decided by $\Delta T_n'$ and computation complexity and it is also taking the minimum time unit of the system as the computation unit.

There is a simplified and adjusted method for the second method, i.e. no chips set to 0 are expanded on the user channel estimation result and the method specifically includes:

A user of the home cell sequentially intercepts W' chips in the whole channel estimation result of the cell from the first chip and obtains the channel estimation results of the $1^{st}$ . . . $K^{th}$ users and a user of a neighboring cell intercepts the chips with the same method.

The channel estimation result of each user in the home cell doesn't need to be adjusted;

For the channel estimation result of each user in a neighboring cell, if the neighboring cell is slower than the home cell and $\Delta T_n\leqq W'$, the first $\Delta T_n'$ chips in the channel estimation result of the user are set to 0; if the neighboring cell is slower than the home cell and $\Delta T_n>W'$, W' chips in the channel estimation result of the user are set to 0; if the neighboring cell is earlier than the home cell and $\Delta T_n\leqq W'$, the last $\Delta T_n$ chips in the channel estimation result of the user are set to 0; if the neighboring cell is earlier than the home cell and $\Delta T_n>W'$, W' chips in the channel estimation result of the user are set to 0; if $\Delta T_n=0$, no adjustment is made.

When the user channel estimation result is intercepted, if the number of users in each cell which are allowed to perform the channel estimation is different, i.e. the length of the intercepted user channel estimation result is different form users in different cells, the length of the intercepted user channel estimation result for each user in the same cell is the same.

For the simplicity of description, supposing that the comparative delay between a neighboring cell and the home cell is $\Delta T_n$ and the standard delay difference $\Delta T_n'$ is obtained by rounding the comparative delay different $\Delta T_n$.

The following two adjustment methods have the same intercepting method.

The channel estimation result of each user in the home cell is intercepted respectively from the first chip of the whole channel estimation result of the home cell;

If signals in a neighboring cell lag behind that in the home cell, the channel estimation result of each user in the neighboring cell is cyclically intercepted respectively from the $\Delta T_n'+1$ chip of the whole channel estimation result of the neighboring cell; If signals in a neighboring cell are earlier than that in the home cell, the channel estimation result of each user in the neighboring cell is cyclically intercepted respectively from the $Ln-\Delta T_n'+1$ chip of the whole channel estimation result of the neighboring cell.

The First Method:

Supposing the length of rounding the user channel estimation result in the home cell is $W_0$ and the length of rounding the user channel estimation result in a neighboring cell is $W_n$, wherein the subscript n represents the number of the neighboring cell;

The channel estimation result of each user in the home cell is expanded according to the following method:

Obtain $\Delta T_{max}^{-'}$, which is a comparative delay of a signal of a user in the home cell and in neighboring cells with a maximum value which is earlier than all the comparative delay $\Delta T_n'$ of the signals of users in the home cell, wherein "–" represents being earlier; n1 is set as the number of neighboring cells whose comparative delay is earlier than that of the home cell and n2 is set as the number of neighboring cells whose comparative delay is slower than that of the home cell and $\max(W_0, \{W_{n1}-\Delta T_{n1}'\}, \{W_{n2}+\Delta T_{n2}'\})$ is obtained, which is represented by $W_{max}$;

$\Delta T_{max}^{-'}$ chips set to 0 are expanded before the channel estimation result of each user in the home cell and $(W_{max}-W_0)$ chips set to 0 are expanded at the end;

The channel estimation result of each user in neighboring cells is expanded according to the following method:

For the channel estimation result of neighboring cells which are slower than that of the home cell, $(\Delta T_{max}^{-'}+\Delta T_n')$ chips set to 0 are expanded at the beginning of the estimation result of each user in neighboring cells and $(W_{max}-(W_n+\Delta T_n'))$ chips set to 0 are expanded after the estimation result;

For the channel estimation result of neighboring cells which are earlier than that of the home cell, $(\Delta T_{max}^{-'}-\Delta T_n')$ chips set to 0 are expanded at the beginning of the estimation result of each user in neighboring cells and $(W_{max}-(W_n-\Delta T_n'))$ chips set to 0 are expanded after the estimation result;

The Second Method:

Supposing the length of rounding the user channel estimation result in the home cell is $W_0$ and the length of rounding the user channel estimation result in a neighboring cell is $W_n$, wherein the subscript n represents the number of the neighboring cell; The channel estimation result of each user in the home cell is expanded according to the following method:

L1 chips set to 0 are expanded at the beginning of the channel estimation result of each user in the home cell and if there is no neighboring cell which is earlier than the home cell, no expanding is made, i.e. L1=0; L2 chips set to 0 are expanded after the estimation result and if there is no neighboring cell which is slower than the home cell, no expanding is made, i.e. L2=0;

The channel estimation result of each user in neighboring cells is expanded according to the following method:

When $W_0+L2\geqq W_n$ and the neighboring cell signals are slower than those of the home cell, expanding is made according to the following method:

when $\Delta T_n'\leqq L2+(W_0-W_n)$, $L1+\Delta T_n'$ chips set to 0 are expanded before the channel estimation result of each user in neighboring cells and $L2+(W_0-W_n)-\Delta T_n'$ chips set to 0 are expanded at the end;

when $\Delta T_n'>L2+(W_0-W_n)$ but $\Delta T_n'\leqq L2+W_0$, $L1+\Delta T_n'$, chips set to 0 are expanded before the channel estimation result of each user in neighboring cells and the last $\Delta T_n'-(L2+(W_0-W_n))$ chips of the channel estimation result are deleted;

when $\Delta T_n'>L2+W_0$, the channel estimation result of each user in neighboring cells are composed by $W_0+L1+L2$ chips set to 0;

When $W_0+L2 \geq W_n$ and the neighboring cell signals are earlier than those of the home cell, expanding is made according to the following method:

when $\Delta T_n' \leq L1$, $L1-\Delta T_n'$ chips set to 0 are expanded at the beginning of the channel estimation result of each user in neighboring cells and $L2+(W_0-W_n)+\Delta T_n'$ chips set to 0 are expanded at the end;

when $\Delta T_n'>L1$ but $\Delta T_n' \leq L1+W_n$, $L2+(W_0-W_n)+\Delta T_n'$ chips set to 0 are expanded at the end of the channel estimation result of each user in neighboring cells and the first $\Delta T_n'-L1$ chips of the channel estimation result are deleted;

when $\Delta T_n'>L1+W_n$, the channel estimation result of each user in neighboring cells are composed by $W_0+L1+L2$ chips set to 0.

When $W_0+L2<W_n$ and the neighboring cell signals are slower than those of the home cell, expanding is made according to the following method:

when $\Delta T_n' \leq L2+W_0$, $L1+\Delta T_n'$ chips set to 0 are expanded before the channel estimation result of each user in neighboring cells and the last $\Delta T_n'+(W_n-(W_0+L2))$ chips are deleted;

when $\Delta T_n'>L2+W_0$, the channel estimation result of each user in neighboring cells are composed by $W_0+L1+L2$ chips set to 0.

When $W_0+L2<W_n$ and the neighboring cell signals are earlier than those of the home cell, expanding is made according to the following method:

when $\Delta T_n' \leq L1$ and $\Delta T_n' \leq (W_n-(W_0+L2))$, $L1-\Delta T_n'$ chips set to 0 are expanded at the beginning of the channel estimation result of each user in neighboring cells and $\Delta T_n'-(W_n-(W_0+L2))$ chips set to 0 are expanded at the end;

when $\Delta T_n' \leq L1$ and $\Delta T_n' < (W_n-(W_0+L2))$, $L1-\Delta T_n'$ chip set to 0 are expanded at the beginning of the channel estimation result of each user in neighboring cells and the last $(W_n-(W_0+L2))-\Delta T_n'$ chips of the channel estimation result are deleted;

when $\Delta T_n'>L1$ and $\Delta T_n' \leq (W_n-(W_0+L2))$ but $\Delta T_n' \leq L1+W_n$, $\Delta T_n'-(W_n(W_0+L2))$ chips set to 0 are expanded at the end of the channel estimation result of each user in neighboring cells and the first $\Delta T_n'-L1$ chips of the channel estimation result are deleted;

when $\Delta T_n'>L1$ and $\Delta T_n'<(W_n-(W_0+L2))$ but $\Delta T_n' \leq L1+W_n$ the first $\Delta T_n'-L1$ chips of the channel estimation result are deleted and the last $(W_n-(W_0+L2))-\Delta T'_n$ chips of the channel estimation result are deleted;

when $\Delta T_n'>L1+W_n$, the channel estimation result of each user in neighboring cells are composed by $W_0+L1+L2$ chips set to 0.

Of course, there are other intercepting and expanding methods and will not be illustrated here in detail.

The adjustment for the combined channel response estimation result of the home cell and neighboring cells is similar with the above adjustment and will not be illustrated in detail here.

According to the present invention, for asynchronous interferences between signals in universal-frequency neighboring cells in the time-slotted CDMA system, the channel estimation result of the home cell and/or neighboring cells or the estimation result of the combined channel response is modified according to the comparative delays between signals of users in different cells so as to suppress the asynchronous universal-frequency interference from neighboring cells.

Three universal-frequency cells are taken as an example to illustrate the multi-cell joint-detection process of the present invention.

Figure 1:
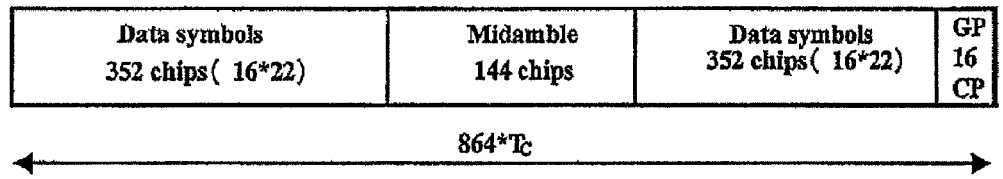
FIG. 1 is a schematic diagram showing a TD-SCDMA service slot burst structure.
Figure 2:
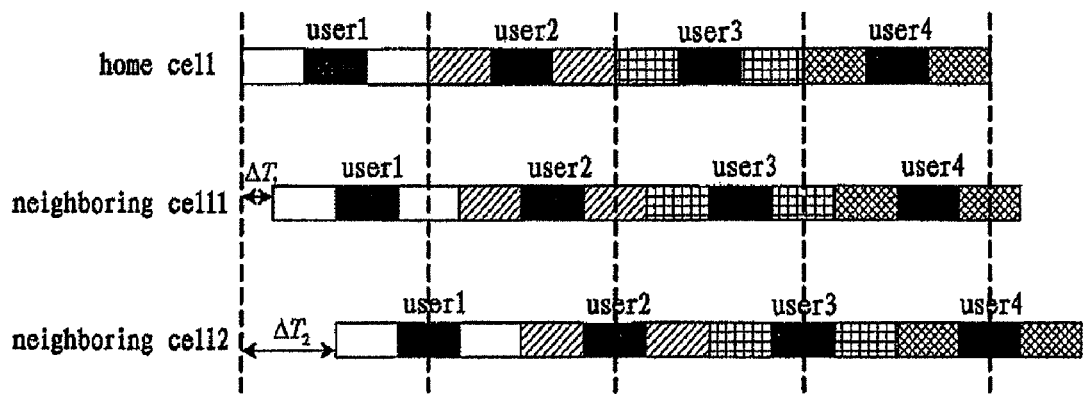
FIG. 2 is a schematic diagram showing a relation between main paths in user channel estimation results of a neighboring cell and a home cell.

Data of signals received by the home cell and two universal-frequency cells which are near or have strong interference such as the two data symbols at the left and right in FIG. 1 can be represented by:

$$e = A_0 d_0 + \sum_{i=1}^{2} A_i d_i + n_0 \qquad (1)$$

$A_0$ and $d_0$ are the transmission matrix and data of the home cell respectively; $A_i$ and $d_i$ are the transmission matrix and data of the $i^{th}$ (i=1,2) neighboring cell respectively; and no is the interference and noise power with the interference from two neighboring cells deleted.

The first step is the multi-cell channel estimation.

The channel estimation codes of the three universal-frequency cells correspond to the channel estimation code signals of the three code sets and the channel estimation results of the three universal-frequency neighboring cells can be obtained according to the multi-code set channel estimation method.

Supposing that he channel estimation results of the three universal-frequency neighboring cells are h0', h1' and h2' respectively, wherein h0' is the channel estimation result of the home cell, h1' is the channel estimation result of the interference cell 1 and h2' is the channel estimation result of the interference cell 2.

Figure 4:
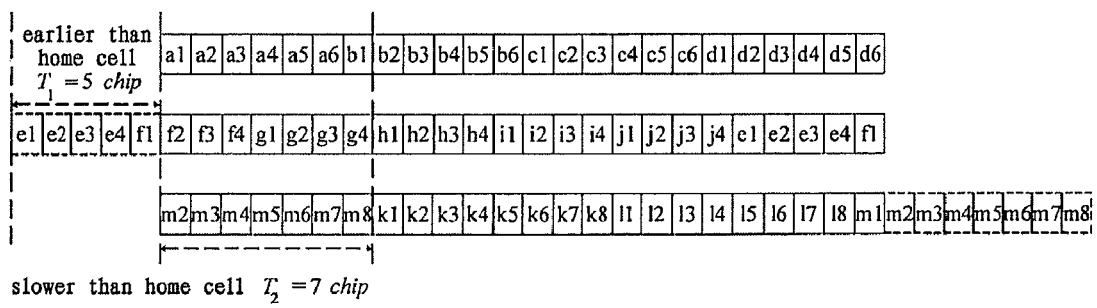
FIG. 4 is a schematic diagram showing a relation between positions of channel estimation results of different cells.

As shown in FIG. 4, supposing the length of the whole channel estimation is 24 chips; the channel estimation can be performed for at most 4 users in the home cell, i.e. the length (before adjustment) of the channel estimation result of each user in the home cell is 6 chips; the channel estimation can be performed for at most 6 users in the neighboring cell 1, i.e. the length (before adjustment) of the channel estimation result of each user in the neighboring cell 1 is 4 chips; the channel estimation can be performed for at most 3 users in the neighboring cell 2, i.e. the length (before adjustment) of the channel estimation result of each user in the neighboring cell 2 is 8 chips; supposing the neighboring cell 1 is earlier than the home cell by 5 chips and the neighboring cell 2 is slower than the home cell by 7 chips; supposing the length of the spreading code Q=4.

The channel estimation result of each cell can be represented as following by using a, b, c, d as the channel estimation results of the 4 users in the home cell, using e, f, g, h, i, j as the channel estimation results of the 6 users in the neighboring cell 1 and using k, l, m as the channel estimation results of the 3 users in the neighboring cell 2, wherein a=(a1, a2, ..., a6) and the others are similar to a.

$$h0' = \begin{pmatrix} a1, a2, a3, a4, a5, a6, b1, b2, b3, b4, b5, b6, \\ c1, c2, c3, c4, c5, c6, d1, d2, d3, d4, d5, d6 \end{pmatrix};$$

$$h1' = \begin{pmatrix} f2, f3, f4, g1, g2, g3, g4, h1, h2, h3, h4, \\ i1, i2, i3, i4, j1, j2, j3, j4, e1, e2, e3, e4, f1 \end{pmatrix};$$

$$h2' = \begin{pmatrix} m2, m3, m4, m5, m6, m7, m8, k1, k2, k3, k4, k5, \\ k6, k7, k8, 11, 12, 13, 14, 15, 16, 17, 18, m1 \end{pmatrix};$$

Since the channel estimation codes (such as the midamble in FIG. 1) allocated to each user are cyclically shifted, the cyclically shifted channel estimation results are guaranteed when there are comparative delays. The comparative delay of the neighboring cell 1 is 5 chips earlier so e1, e2, e3, e4, f1 in h1' are cyclically shifted to the end of the channel estimation result; the comparative delay of the neighboring cell 2 is 7 chips slower so m2, m3, m4, m5, m6, m7, m8 in h1' are cyclically shifted to the beginning of the channel estimation result.

For the second step, there are two methods. One is that the channel estimation result of each user in different cells is adjusted according to the comparative delay and then the estimation result of the combined channel response is computed; the other is that the channel estimation result of each user in different cells is not adjusted and the estimation result of the combined channel response is computed and then the estimation result of the combined channel response is adjusted according to the comparative delay. The explanation of the two methods is described in the following.

For the first method according to which the channel estimation result of each user in different cells is adjusted, there are two adjustment methods.

The First Adjustment Method

Only the neighboring cell 1 is earlier than the home cell, so $\Delta T^-_{max}{}'=\Delta T_1'=5$ chips; $W_{max}=\max(W_0,\{W_{n1}-\Delta T_{n1}'\},\{W_{n2}+\Delta T_{n2}'\})=\max(W_0,\{W_1-\Delta T_1'\},\{W_2+\Delta T_2'\})=\max(6,\{4-5\},\{8+7\})=\max(6,-1,15)=15$ chips;

For the home cell: 6 chips are sequentially and cyclically intercepted in the whole channel estimation result h0' of the cell from the first chip and the channel estimation results of user a, b, c, d are obtained respectively; and then the results are expanded by expanding $\Delta T_{max}{}^-{}'=5$ chips set to 0 at the beginning of the channel estimation result of each user in the home cell and expanding $W_{max}-W_0=15-6=9$ chips set to 0 at the end. The channel estimation results after adjustment are:
   a=(0,0,0,0,0,a1,a2, . . . , a6,0,0,0,0,0,0,0,0,0);
   b=(0,0,0,0,0,b1,b2, . . . , b6,0,0,0,0,0,0,0,0,0);
   c=(0,0,0,0,0,c1,c2, . . . , c6,0,0,0,0,0,0,0,0,0);
   d=(0,0,0,0,0,d1,d2, . . . , c6,0,0,0,0,0,0,0,0,0);

For the neighboring cell 1: since the neighboring cell 1 is earlier than the home cell by 5 chips, 4 chips are sequentially and cyclically intercepted h1' from the 24−5+1=20$^{th}$ chip and the channel estimation results of user e, f, g, h, i, j are obtained respectively; and then the results are expanded by expanding $\Delta T_{max}{}^-{}'-\Delta T_1'=5-5=0$ chip set to 0 at the beginning of the channel estimation result of each user in the home cell and expanding $W_{max}-(W_1-\Delta T_1')=15-(4-5)=16$ chips set to 0 at the end. The channel estimation results after adjustment are:
   e=(e1,e2,e3,e4,0,0,0,0,0,0,0,0,0,0,0,0,0,0,0,0);
   f=(f1,f2,f3,f4,0,0,0,0,0,0,0,0,0,0,0,0,0,0,0,0);
   g=(g1,g2,g3,g4,0,0,0,0,0,0,0,0,0,0,0,0,0,0,0,0);
   h=(h1,h2,h3,h4,0,0,0,0,0,0,0,0,0,0,0,0,0,0,0,0);
   i=(i1,i2,i3,i4,0,0,0,0,0,0,0,0,0,0,0,0,0,0,0,0);
   j=(j1,j2,j3,j4,0,0,0,0,0,0,0,0,0,0,0,0,0,0,0,0);

For the neighboring cell 2: since the neighboring cell 2 is slower than the home cell by 7 chips, 8 chips are sequentially intercepted h2' from the 7+1=8$^{th}$ chip and the channel estimation results of user k, l, m are obtained respectively; and then the results are expanded by expanding $\Delta T_{max}{}^-{}'+\Delta T_2'=5+7=12$ chips set to 0 at the beginning of the channel estimation result of each user in the home cell and expanding $W_{max}-(W_2+\Delta T_2')=15-(8+7)=0$ chip set to 0 at the end. The channel estimation results after adjustment are:
   k=(0,0,0,0,0,0,0,0,0,0,0,0,k1,k2,k3,k4,k5,k6,k7,k8)
   l=(0,0,0,0,0,0,0,0,0,0,0,0,l1,l2,l3,l4,l5,l6,l7,l8)
   m=(0,0,0,0,0,0,0,0,0,0,0,0,m1,m2,m3,m4,m5,m6,m7,m8).

According to the first adjustment method, the channel estimation result of each user in different cells is adjusted to the same length of 20 chips according to the comparative delay.

The Second Adjustment Method

For the home cell: 6 chips are sequentially and cyclically intercepted in the whole channel estimation result h0' of the cell from the first chip and the channel estimation results of user a, b, c, d are obtained respectively; supposing that the number of 0 added at the beginning and at the end of the channel estimation result are the same, i.e. L1=L2=L=2 chips. The channel estimation results after adjustment are:
   a=(0,0,a1,a2, . . . , a6,0,0);
   b=(0,0,b1,b2, . . . , b6,0,0);
   c=(0,0,c1,c2, . . . , c6,0,0);
   d=(0,0,d1,d2, . . . , c6,0,0);

For the neighboring cell 1: since the neighboring cell 1 is earlier than the home cell by 5 chips, 4 chips are sequentially and cyclically intercepted h1' from the 24−5+1=20$^{th}$ chip and the channel estimation results of user e, f, g, h, i, j are obtained respectively; and then the results are expanded: since $W_0+L2=6+2=8>=4=W_1$ and $\Delta T_1'=5>2=L1$ but $\Delta T_1'=5<=2+4=6=L1+W_1$, the first $\Delta T_1'-L1=5-2=3$ chips are deleted and $L2+(W_0-W_1)+\Delta T_1'=2+6-4+5=9$ chips set to 0 are expanded at the end. The channel estimation results after adjustment are:
   e=(e4,0,0,0,0,0,0,0,0,0);
   l=(f4,0,0,0,0,0,0,0,0,0);
   g=(g4,0,0,0,0,0,0,0,0,0);
   h=(h4,0,0,0,0,0,0,0,0,0);
   i=(i4,0,0,0,0,0,0,0,0,0);
   j=(j4,0,0,0,0,0,0,0,0,0);

For the neighboring cell 2: since the neighboring cell 1 is slower than the home cell by 7 chips, 8 chips are sequentially intercepted h2' from the 7+1=8$^{th}$ chip and the channel estimation results of user k, l, m are obtained respectively; and then the results are expanded: since $W_0+L2=6+2\ 28>=8=W_2$ and $\Delta T_2'=7>2+6-8=0=L2+(W_0-W_2)$ but $\Delta T_2'=7<=2+6=8=L2+W_0$, the last $\Delta T_2'-(L2+(W_0-W_2))=7-(2+6-8)=7$ chips are deleted and $L1+\Delta T_2'=2+7=9$ chips set to 0 are expanded at the beginning. The channel estimation results after adjustment are:
   k=(0,0,0,0,0,0,0,0,0,k1)
   l=(0,0,0,0,0,0,0,0,0,l1)
   m=(0,0,0,0,0,0,0,0,0,m1).

According to the second adjustment method, the channel estimation result of each user in different cells is adjusted to the same length of 10 chips according to the comparative delay.

Then the estimation result of the combined channel response is computed.

The combined channel response of the user is obtained by convoluting the spreading code and the channel estimation result of the user, i.e. b=C⊗h, wherein the length of b is Q+W−1 and according to the first adjustment method, Q+W−1=4+20−1=23 chips; according to the second adjustment method, Q+W−1=4+10−1=13 chips. The estimation result of the combined channel response of each cell can be represented as the following, wherein "'" at the upper right of the symbol of the estimation result of each user represents the estimation result of the combined channel response.

According to the first adjustment method:
   for the home cell:
   a'=(0,0,0,0,0,a'1,a'2, . . . , a'9,0,0,0,0,0,0,0,0,0)
   b'=(0,0,0,0,0,b'1,b'2, . . . , b'9,0,0,0,0,0,0,0,0,0)
   c'=(0,0,0,0,0,c'1,c'2, . . . , c'9,0,0,0,0,0,0,0,0,0)
   d'=(0,0,0,0,0,d'1,d'2, . . . , c'9,0,0,0,0,0,0,0,0,0)
   for the neighboring cell 1:
   e'=(e'1,e'2, . . . . , e'7,0,0,0,0,0,0,0,0,0,0,0,0,0,0,0,0);
   f''=(f'1,f'2, . . . . , f'7,0,0,0,0,0,0,0,0,0,0,0,0,0,0,0,0);
   g'=(g'1,g'2, . . . . , g'7,0,0,0,0,0,0,0,0,0,0,0,0,0,0,0,0);
   h'=(h'1,h'2, . . . . , h'7,0,0,0,0,0,0,0,0,0,0,0,0,0,0,0,0);

i'=(i'1,i'2, . . . . , i'7,0,0,0,0,0,0,0,0,0,0,0,0,0,0,0,0);
j'=(j'1,j'2, . . . . , j'7,0,0,0,0,0,0,0,0,0,0,0,0,0,0,0,0);
for the neighboring cell 2:
k'=(0,0,0,0,0,0,0,0,0,0,0,0,k'1,k'2, . . . , k'11);
l'=(0,0,0,0,0,0,0,0,0,0,0,0,l'1,l'2, . . . . , l'11)
m'=(0,0,0,0,0,0,0,0,0,0,0,0,m'1,m'2, . . . . , m'11)
According to the second adjustment method:
for the home cell:
a'=(0,0,a'1,a'2, . . . . , a'9,0,0)
b'=(0,0,b'1,b'2, . . . . , b'9,0,0)
c'=(0,0,c'1,c'2, . . . . , c'9,0,0)
d'=(0,0,d'1,d'2, . . . . , c'9,0,0)
for the neighboring cell 1:
e'=(e'1,e'2,e'3,e'4,0,0,0,0,0,0,0,0,0);
f'=(f'1,f'2,f'3,f'4,0,0,0,0,0,0,0,0,0);
g'=(g'1,g'2,g'3,g'4,0,0,0,0,0,0,0,0,0);
h'=(h'1,h'2,h'3,h'4,0,0,0,0,0,0,0,0,0);
i'=(i'1,i'2,i'3,i'4,0,0,0,0,0,0,0,0,0);
j'=(j'1,j'2,j'3,j'4,0,0,0,0,0,0,0,0,0);
for the neighboring cell 2:
k'=(0,0,0,0,0,0,0,0,0,k'1,k'2,k'3,k'4);
l'=(0,0,0,0,0,0,0,0,0,l'1,l'2,l'3,l'4);
m'=(0,0,0,0,0,0,0,0,0,m'1,m'2,m'3,m'4).
The Second Method The channel estimation result of each user in different cells is not adjusted.

For the home cell: 6 chips are sequentially and cyclically intercepted in the whole channel estimation result h0' of the cell from the first chip and the channel estimation results of user a, b, c, d are obtained respectively:
a=(a1,a2, . . . , a6);
b=(b1,b2, . . . , b6);
c=(c1,c2, . . . , c6);
d=(d1,d2, . . . , c6);

For the neighboring cell 1: since the neighboring cell 1 is earlier than the home cell by 5 chips, 4 chips are sequentially and cyclically intercepted h1' from the 24−5+1=20$^{th}$ chip and the channel estimation results of user e, f, g, h, i, j are obtained respectively:
e=(e1,e2,e3,e4);
f=(f1,f2,f3,f4);
g=(g1,g2,g3,g4);
h=(h1,h2,h3,h4);
i=(i1,i2,i3,i4);
j=(j1,j2,j3,j4);

For the neighboring cell 2: since the neighboring cell 1 is slower than the home cell by 7 chips, 8 chips are sequentially intercepted h2' from the 7+1=8$^{th}$ chip and the channel estimation results of user k, l, m are obtained respectively:
k=(k1,k2,k3,k4,k5,k6,k7,k8);
l=(l1,l2,l3,l4,l5,l6,l7,l8);
m=(m1,m2,m3,m4,m5,m6,m7,m8).

Then the estimation result of the combined channel response is computed.

The combined channel response of the user is obtained by convoluting the spreading code and the channel estimation result of the user, i.e. b=C⊗h, wherein the length of b is Q+W−1 which varies according to W. The estimation result of the combined channel response of each cell can be represented as the following, wherein "'" at the upper right of the symbol of the estimation result of each user represents the estimation result of the combined channel response.

For the home cell: W=6 chips, so the length of the combined channel response is 4+6−1=9 chips:
a'=(a'1,a'2, . . . , a'9);
b'=(b'1,b'2, . . . , b'9);
c'=(c'1,c'2, . . . , c'9);
d'=(d'1,d'2, . . . , c'9);

For the neighboring cell 1: W=4 chips, so the length of the combined channel response is 4+4−1=7 chips:
e'=(e'1,e'2, . . . , e'7);
f'=(f'1,f'2, . . . , f'7);
g'=(g'1,g'2, . . . , g'7);
h'=(h'1,h'2, . . . , h'7);
j'=(j'1,j'2, . . . , j'7);

For the neighboring cell 2: W=8 chips, so the length of the combined channel response is 4+8−1=11 chips:
k'=(k'1,k'2, . . . , k'11);
l'=(l'1,l'2, . . . , l'11);
m'=(m'1,m'2, . . . , m'11).

And then the estimation result of the combined channel response is adjusted according to the comparative delay.

The First Adjustment Method

Only the neighboring cell 1 is earlier than the home cell, so $\Delta T_{max}^{-'}=\Delta T_1'=5$ chip; $W_{max}=\max(W_0,\{W_{n1}-\Delta T_{n1}'\},\{W_{n2}+\Delta T_{n2}'\})=\max(W_0,\{W_1-\Delta T_1'\},\{W_2+\Delta T_2'\})=\max(9,\{7-5\},\{11+7\})=\max(9,2,18)=18$ chips;

For the home cell: $\Delta T_{max}^{-'}=5$ chips set to 0 are expanded at the beginning of the estimation result of the combined channel response of user of the home cell and $W_{max}-W_0=18-9=9$ chips set to 0 are expanded at the end. The estimation results of the combined channel responses after adjustment are:
a'=(0,0,0,0,0, a'1,a'2, . . . , a'9,0,0,0,0,0,0,0,0,0)
b'=(0,0,0,0,0, b'1,b'2, . . . , b'9,0,0,0,0,0,0,0,0,0)
c'=(0,0,0,0,0, c'1,c'2, . . . , c'9,0,0,0,0,0,0,0,0,0)
d'=(0,0,0,0,0, d'1,d'2, . . . , c'9,0,0,0,0,0,0,0,0,0)

For the neighboring cell 1: $\Delta T_{max}^{-'}-\Delta T_1'=5-5=0$ chip set to 0 is expanded at the beginning of the estimation result of the combined channel response of user of the home cell, i.e. no expanding is made at the beginning and $W_{max}-(W_1-\Delta T_1')=18-(7-5)=16$ chips set to 0 are expanded at the end. The estimation results of the combined channel responses after adjustment are:
e'=(e'1,e'2, . . . , e'7,0,0,0,0,0,0,0,0,0,0,0,0,0,0,0,0);
f'=(f'1,f'2, . . . ,'7,0,0,0,0,0,0,0,0,0,0,0,0,0,0,0,0);
g'=(g'1,g'2, . . . , g'7,0,0,0,0,0,0,0,0,0,0,0,0,0,0,0,0);
h'=(h'1,h'2, . . . , h'7,0,0,0,0,0,0,0,0,0,0,0,0,0,0,0,0);
i'=(i'1,i'2, . . . , i'7,0,0,0,0,0,0,0,0,0,0,0,0,0,0,0,0);
j'=(j'1,j'2, . . . , j'7,0,0,0,0,0,0,0,0,0,0,0,0,0,0,0,0);

For the neighboring cell 2: $\Delta T_{max}^{-'}+\Delta T_2'=5+7=12$ chips set to 0 is expanded at the beginning of the estimation result of the combined channel response of user of the home cell and $W_{max}-(W_2+\Delta T_2')=18-(11+7)=0$ chip set to 0 is expanded at the end i.e. no expanding is made at the end. The estimation results of the combined channel responses after adjustment are:
k'=(0,0,0,0,0,0,0,0,0,0,0,0, k'1,k'2, . . . , k'11)
l'=(0,0,0,0,0,0,0,0,0,0,0,0, l'1,l'2, . . . , l'11)
m'=(0,0,0,0,0,0,0,0,0,0,0,0, m'1,m'2, . . . , m'11).

According to the first adjustment method, the estimation result of the combined channel response of each user in different cells is adjusted to the same length of 23 chips according to the comparative delay.

The Second Adjustment Method

For the home cell: supposing that the number of 0 added at the beginning and at the end of the channel estimation result are the same, i.e. L1=L2=L=2 chips. The estimation results of the combined channel responses after adjustment are:
a'=(0,0,a'1,a'2, . . . , a'9,0,0)
b'=(0,0,b'1,b'2, . . . , b'9,0,0)
c'=(0,0,c'1,c'2, . . . , c'9,0,0)
d'=(0,0,d'1,d'2, . . . , c'9,0,0)

For the neighboring cell 1: since the neighboring cell 1 is earlier than the home cell by 5 chips and since $W_0+L2=9+$ 2=11>=7=W₁ and ΔT₁'=5>2=L1 but ΔT₁'=5<=2+9=11=L1+W₁, the first ΔT₁'−L1=5−2=3 chips are deleted and L2+(W₀−W₁)+ΔT₁'=2+9−7+5=9 chips set to 0 are expanded at the end. The estimation results of the combined channel responses after adjustment are:

e'=(e'4,e'5,e'6,e'7,0,0,0,0,0,0,0,0);
f''=(f'4,f'5,f'6,f'7,0,0,0,0,0,0,0,0);
g'=(g'4,g'5,g'6,g'7,0,0,0,0,0,0,0,0);
h'=(h'4,h'5,h'6,h'7,0,0,0,0,0,0,0,0);
i'=(i'4,i'5,i'6,i'7,0,0,0,0,0,0,0,0);
j'=(j'4,j'5,j'6,j'7,0,0,0,0,0,0,0,0);

For the neighboring cell 2: since the neighboring cell 2 is slower than the home cell by 7 chips and since $W_0+L2=9+2=11>=11=W_2$ and $\Delta T_2'=7>2+9-11=0=L2+(W_0-W_2)$ but $\Delta T_2'=7<=2+9=11=L2+W_0$, the last $\Delta T_2'-(L2+(W_0-W_2))=7-(2+9-11)=7$ chips are deleted and $L1+\Delta T_2'=2+7=9$ chips set to 0 are expanded at the beginning. The estimation results of the combined channel responses after adjustment are:

k'=(0,0,0,0,0,0,0,0,0,k'1,k'2,k'3,k'4);
l'=(0,0,0,0,0,0,0,0,0,l'1,l'2,l'3,l'4);
m'=(0,0,0,0,0,0,0,0,0,m'1,m'2,m'3,m'4).

According to the second adjustment method, the estimation result of the combined channel response of each user in different cells is adjusted to the same length of 13 chips according to the comparative delay.

In the third step, the multi-cell joint-detection is performed according to the estimation result of the combined channel response of each user in different cells and the detection data is obtained.

Firstly, code channels of the three cells are divided into different groups.

According to the dividing method based on the cell the code channel belongs to, the code channels can be divided into three groups according to the number of the cells and the signals after dividing can be represented as:

$$e=A_0d_0+A_1d_1+A_2d_2+n_0 \quad (2)$$

The transmission matrix $A_i$, i=0,1,2 is composed by the estimation result vector of the combined channel response of each user in the home cell obtained from the second step.

According to the second dividing method based on the code channel power or amplitude, the channel response or combined channel response can be obtained according to the multi-cell channel estimation result or the power of each code channel signal can be estimated according to the output of the matching and filtering of each code channel; then all the code channels are divided into two groups according to the power, wherein the code channels of the users to be detected and interference code channels with strong power are divided into code channel group to participate the joint-detection and the code channels with weak power are divided into the interference code channel group. The signals after dividing can be represented as:

$$e=A_Sd_S+(A_Id_I+n_0) \quad (3)$$

$A_S$ and $d_S$ are the transmission matrix and data of the group of code channels to participate the joint-detection; $A_I$ and $d_I$ are the transmission matrix and data of the group of interference code channels; the composition of $A_S$ and $A_I$ is the same as that in the first dividing method.

According to the third dividing method based on the code channel correlation, firstly the average of correlation between all code channels (code channel here refers to the compound code of the spreading code and interference code, or the estimation value of the combined channel response) of users to be detected and those not is estimated and then all the code channels are divided into two groups according to the correlation, wherein the code channels of the users to be detected and code channels with strong correlation are divided into code channel group to participate the joint-detection and the remaining code channels are divided into the interference code channel group. The signals after dividing can be represented as:

$$e=A_Sd_S+(A_Id_I+n_0) \quad (4)$$

$A_S$ and $d_S$ are the transmission matrix and data of the group of code channels to participate the joint-detection; $A_I$ and $d_I$ are the transmission matrix and data of the group of interference code channels; the composition of $A_S$ and $A_I$ is the same as that in the first dividing method and uses the same expression as in the second dividing method.

Then the joint-detection is performed.

For the first code channel grouping method, the joint-detection can be linear block balance method+interference counteraction method.

For each group, the joint-detection method of linear block balance is performed on all the received signals, i.e. the single cell joint-detection method.

The interference recovery is performed for each of the detected group;

Interferences not belong to the group is counteracted in all the received signals and net signals are obtained;

The linear block balance joint-detection method is performed on the net signals in the group where the user to be detected is in and the result of the user to be detected is obtained.

In the above process, the interference counteraction is only used for one time. In an actual system, multiple times of interference counteraction can be used according to the practice so as to obtain the required performance.

For the second and third code channel grouping method, the linear block balance joint-detection method can be performed for the code channel groups participating in the joint-detection.

The estimated soft output value of the transmission data $d_S$ is:

$$\hat{d}_S = (T_S)^{-1} A_S^{*T} R_n^{-1} e \quad (5)$$

Matrix T is shown as:

$$T_S = \begin{cases} I & MF \\ A_S^{*T}R_n^{-1}A_S & ZF-BLE \\ A_S^{*T}R_n^{-1}A_S + R_d^{-1} & MMSE-BLE \end{cases} \quad (6)$$

And $$R_n=E\{n \cdot n^{*T}\}=E\{(A_Id_I+n_0)\cdot(A_Id_I+n_0)^{*T}\}=A_IA_I^{*T}+\sigma^2I \quad (7)$$

In practice, all the interferences can be processed as the white noise or the whitening processing is firstly performed on the colored noise interference. The characteristic of the interference may be computed according to the interference code channel group and the measured background noise.

According to the present invention, the channel estimation result of each user in different cells or the estimation result of the combined channel response is adjusted according to the comparative delays between signals of users in universal-frequency neighboring cells in the time-slotted CDMA system and then the multi-cell joint-detection is performed according to the estimation result of the combined channel response and the detection data are obtained so as to suppress the interference from universal-frequency neighboring cells.

The method of the present invention can be applied to the time-slotted CDMA system or the wireless communication system using the similar signal structure.

Although the present invention is described with reference to the embodiments, those skilled in the art may understand that there are different variations and modifications without departing the spirit of the present invention. The appended claims include these variations and modifications without departing the spirit of the present invention.

The invention claimed is:

1. A method for multi-cell joint-detection in a time-slotted CDMA system, comprising steps of:
   A. performing a multiple code set channel estimation on received signal data and obtaining channel estimation results of a home cell and of neighboring cells;
   B. adjusting the channel estimation results of the home cell and/or the neighboring cells or the estimation result of a combined channel response of the home cell and the neighboring cells according to a comparative delay difference between signals of users in different cells;
   wherein, step B comprises:
      B1. setting a total length Ln of the channel estimation results of different cells;
      B2. obtaining a comparative delay difference $\Delta T_n$ between signals of the users in a neighboring cell and in the home cell and rounding the comparative delay difference $\Delta T_n$ and obtaining a standard delay difference $\Delta T_n'$;
      B3. intercepting the channel estimation result of each user in the cell from the whole channel estimation result of the home cell and from the whole channel estimation result of the neighboring cell respectively; and
      B4. modifying the channel estimation results of the home cell and/or neighboring cells or the estimation result of the combined channel response according to the intercepting manner of the user channel estimation result and the comparative delay difference $\Delta T_n'$; and
   C. performing a joint-detection according to the estimation result of the combined channel response obtained by adjusting the channel estimation results of the users in different cells or according to the estimation result of the combined channel response and obtaining detection data.

2. The method according to claim 1, wherein the round operation of the comparative delay difference $\Delta T_n$ in step B2 further comprises:
   floor, ceiling or self-defining rounding of the comparative delay difference $\Delta T_n$.

3. The method according to claim 1, wherein step B3 further comprises:
   B311. intercepting the channel estimation result of each user in the home cell respectively from the first chip of the whole channel estimation result of the home cell;
   B312. if signals in a neighboring cell lag behind that in the home cell, cyclically intercepting the channel estimation result of each user in the neighboring cell respectively from the $\Delta T_n'+1$ chip of the whole channel estimation result of the neighboring cell; and
   B313. if signals in a neighboring cell are earlier than that in the home cell, cyclically intercepting the channel estimation result of each user in the neighboring cell respectively from the $Ln-\Delta T_n'+1$ chip of the whole channel estimation result of the neighboring cell.

4. The method according to claim 3, wherein step B4 further comprises:
   B411. setting the length of the channel estimation result of the home cell or the estimation result of the combined channel response to $W_0$ and setting the length of the channel estimation result of the neighboring cell or the estimation result of the combined channel response to $W_n$; expanding $\Delta T_{max}^{-'}$ chips set to 0 at the beginning of the channel estimation result of each user in the home cell or the estimation result of the combined channel response and expanding $(W_{max}-W_0)$ chips set to 0 at the end of the estimation result, wherein
      $\Delta T_{max}^{-'}$ is a comparative delay of a signal of a user in the home cell and in neighboring cells with a maximum value which is earlier than all the comparative delay $\Delta T_n'$ of the signals of users in the home cell;
      $W_{max}$ is a maximum value between the length of the channel estimation result of the home cell or the estimation result of the combined channel response, a result by subtracting the length of the comparative delay from the length of the channel estimation result of the neighboring cell or the estimation result of the combined channel response which is earlier than that of the home cell, a result by adding the length of the comparative delay from the length of the channel estimation result of the neighboring cell or the estimation result of the combined channel response which is slower than that of the home cell;
   B412. expanding the channel estimation result of neighboring cells or the estimation result of the combined channel response according to the following manner:
      for the channel estimation result of neighboring cells or the estimation result of the combined channel response which are slower than that of the home cell, expanding $(\Delta T_{max}^{-'}+\Delta T_n')$ chips set to 0 at the beginning of the estimation result of each user in neighboring cells and expanding $(W_{max}-(W_n+\Delta T_n'))$ chips set to 0 after the estimation result;
      for the channel estimation result of neighboring cells or the estimation result of the combined channel response which are earlier than that of the home cell, expanding $(\Delta T_{max}^{-}-\Delta T_n')$ chips set to 0 at the beginning of the estimation result of each user in neighboring cells and expanding $(W_{max}-(W_n-\Delta T_n'))$ chips set to 0 after the estimation result.

5. The method according to claim 4, wherein step B4 further comprises:
   B421. setting the length of the channel estimation result of the home cell or the estimation result of the combined channel response to $W_0$ and setting the length of the channel estimation result of the neighboring cell or the estimation result of the combined channel response to $W_n$, and expanding l1 chips set to 0 at the beginning of the channel estimation result of each user in the home cell or the estimation result of the combined channel response and expanding l2 chips set to 0 after the estimation result;
   B422. expanding the channel estimation result of neighboring cells or the estimation result of the combined channel response according to the manner of:
      if neighboring cells are slower than the home cell, expanding l1+$\Delta T_n'$ chips set to 0 at the beginning of the estimation result, expanding chips set to 0 or deleting chips at the end of the estimation result according to the relation between $W_n +\Delta T_n'$ and $W_0+l2$ to make the adjusted length equal to that of the estimation result of the user in the home cell; $\Delta T_n'>l2+W_0$, a full zero chip with a length of $W1+l1+l2$ constituting the estimation result of the user;

if neighboring cells are earlier than the home cell, expanding $l1-\Delta T_n'$ chips set to 0 at the beginning of the estimation result according to the relation between $\Delta T_n'$ and $l1$ or deleting the first $\Delta T_n'-l1$ chips of the channel estimation result of the user, expanding chips set to 0 or deleting chips at the end of the estimation result according to the relation between $W_{n+\Delta Tn}'$ and $W_0+l2$ to make the adjusted length equal to that of the estimation result of the user in the home cell; if $\Delta T_n'>l1+W_0$, a full zero chip with a length of $W1+l1+l2$ constituting the estimation result of the user.

6. The method according to claim 1, wherein the estimation result of the combined channel response of each user in the home cell and in neighboring cells according to a formula:

$b=C \otimes h$, wherein C represents a spreading code corresponding to a code channel of the user, $\otimes$ is a convolution operator and h is a channel estimation result of the user.

7. The method according to claim 1, wherein step B further comprises:

dividing code channels in each neighboring cell into different groups.

8. The method according to claim 1, wherein the code channels in each neighboring cell are divided into different groups according to the methods of:

dividing code channels in each neighboring cell into different groups according to the cell they belong to; and/or dividing code channels in each neighboring cell into different groups according to the power or amplitude of code channels; and/or dividing code channels in each neighboring cell into different groups according to code channel correlation.

* * * * *